(12) United States Patent
Sahs et al.

(10) Patent No.: US 10,029,619 B2
(45) Date of Patent: Jul. 24, 2018

(54) VEHICLE CENTER CONSOLE ASSEMBLY (71) Applicant: Nissan North America, Inc., Franklin, TN (US)

(72) Inventors: John A Sahs, San Diego, CA (US); Antonio Manzari, Carlsbad, CA (US)

(73) Assignee: Nissan North America, Inc., Franklin, TN (US)

( * ) Notice: Subject to any disclaimer, the term of this patent is extended or adjusted under 35 U.S.C. 154(b) by 194 days.

(21) Appl. No.: 15/086,426

(22) Filed: Mar. 31, 2016

(65) Prior Publication Data
US 2017/0282807 A1 Oct. 5, 2017

(51) Int. Cl.
*B60R 7/04* (2006.01)
*B60N 3/10* (2006.01)
*B60Q 7/00* (2006.01)

(52) U.S. Cl.
CPC ............... *B60R 7/04* (2013.01); *B60N 3/101* (2013.01); *B60Q 7/00* (2013.01)

(58) Field of Classification Search
CPC .. B60R 7/04; B60N 3/10; B60N 3/101; B60N 3/102; B60N 3/103; B60N 3/105; B60N 3/108; B60Q 7/00
USPC .................................................... 296/24.34
See application file for complete search history.

(56) References Cited

U.S. PATENT DOCUMENTS

| | | | | | |
|---|---|---|---|---|---|
| 3,405,899 | A | * | 10/1968 | Trachtenberg | B60N 3/002 219/202 |
| 3,800,939 | A | * | 4/1974 | Cornelius | B60N 3/103 206/216 |
| 5,050,399 | A | * | 9/1991 | Peahl | B60H 1/00592 62/244 |
| 5,279,489 | A | * | 1/1994 | Wheelock | B60N 3/101 224/926 |
| 5,456,436 | A | * | 10/1995 | Faudie | B60N 3/103 220/737 |
| 6,050,468 | A | * | 4/2000 | Kelley | B60N 3/103 224/542 |
| 7,029,048 | B1 | * | 4/2006 | Hicks | B60N 3/101 296/193.04 |
| 7,770,952 | B2 | * | 8/2010 | Hanzel | B60N 3/08 296/24.34 |
| 2005/0072889 | A1 | * | 4/2005 | Park | B60N 3/101 248/311.2 |

(Continued)

Primary Examiner — Hilary L Gutman (57) ABSTRACT

A vehicle center console assembly includes a main body, a rear compartment lid and at least one removable center console accessory. The main body has a forward accessory area and a rearward compartment area. The rear compartment lid is pivotally attached to the rearward compartment area. The removable center console accessory includes a thermos holder assembly having a housing installed within the forward accessory area of the main body, a pivot structure supported by the housing and a thermos supporting member. A removable thermos bottle is removeably placed in the thermos supporting member. The thermos supporting member is supported by the pivot structure for movement between a horizontal orientation in which the thermos supporting member and the thermos bottle are retained within the housing and an inclined orientation in which the thermos supporting member and the thermos bottle are pivoted upward at least partially out of the housing.

16 Claims, 11 Drawing Sheets (56) References Cited

U.S. PATENT DOCUMENTS

| | | | | |
|---|---|---|---|---|
| 2005/0082455 A1* | 4/2005 | Jones | ............... | B60N 3/107 |
| | | | | 248/311.2 |
| 2006/0214075 A1* | 9/2006 | Cassettari | ........... | B60N 3/103 |
| | | | | 248/311.2 |
| 2011/0095556 A1* | 4/2011 | Werner | ............ | B60N 3/105 |
| | | | | 296/24.34 |
| 2011/0121596 A1* | 5/2011 | Beyer | ............ | B60N 2/468 |
| | | | | 296/24.34 |
| 2014/0367433 A1* | 12/2014 | Rifel | ............ | B60N 3/105 |
| | | | | 224/485 |
| 2015/0183377 A1* | 7/2015 | Ruffner | ............ | B60N 3/104 |
| | | | | 296/37.8 |
| 2015/0217667 A1* | 8/2015 | Senda | ............ | B60N 3/107 |
| | | | | 296/37.8 |
| 2015/0352993 A1* | 12/2015 | Bosma | ............ | B60N 3/103 |
| | | | | 224/544 |
| 2015/0353019 A1* | 12/2015 | Skapof | ............ | B60R 7/04 |
| | | | | 248/311.2 |
| 2017/0136930 A1* | 5/2017 | Corse | ............ | B60N 3/103 |

* cited by examiner

VEHICLE CENTER CONSOLE ASSEMBLY

BACKGROUND

Field of the Invention

The present invention generally relates to a vehicle center console assembly. More specifically, the present invention relates to a center console assembly that includes removable accessories, including a thermos holder assembly.

Background Information

Most modern vehicle include a center console located with a passenger compartment between front seats within the vehicle. The center console assembly typically extends from between the front seats to a lower central portion of an instrument panel at the front of the passenger compartment.

SUMMARY

One object of the disclosure is to provide a vehicle with a center console assembly with a removable accessory such as a thermos holder assembly that can be removed from the center console and replaced with an alternative accessory assembly.

In view of the state of the known technology, one aspect of the present disclosure is to provide a vehicle center console assembly with a main body, a rear compartment lid and at least one removable center console accessory. The main body has a forward accessory area and a rearward compartment area. The rear compartment lid pivotally is attached to the rearward compartment area of the main body. The at least one removable center console accessory includes a thermos holder assembly. The thermos holder assembly has a housing installed within the forward accessory area of the main body, a pivot structure supported by the housing and a thermos supporting member that includes a removable thermos bottle. The thermos supporting member is supported by the pivot structure for movement between a horizontal orientation in which the thermos supporting member and the thermos bottle are retained within the housing, and an inclined orientation in which the thermos supporting member and the thermos bottle are pivoted upward at least partially out of the housing such that the thermos bottle is removable from the thermos supporting member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
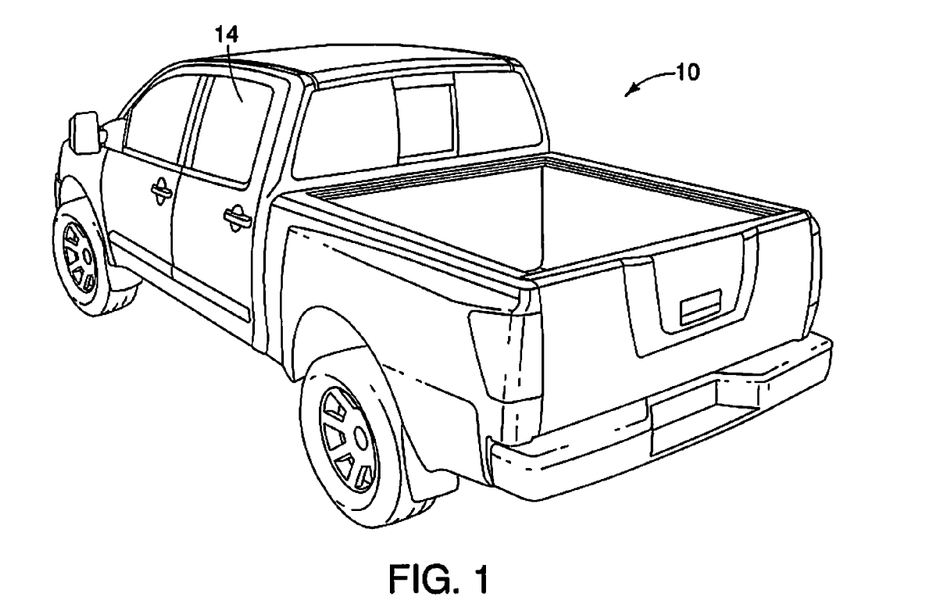
FIG. 1 is a perspective view of a vehicle having a passenger compartment with a center console assembly in accordance with a first embodiment.

Referring initially to FIG. 1, a vehicle 10 having a center console assembly 12 (FIG. 2) is illustrated in accordance with a first embodiment. In the depicted embodiment, the vehicle 10 is a pickup truck. However it should be understood from the drawings and the description herein that the center console assembly 12 can be installed in any of a variety of vehicle configurations, including but not limited to a sedan, a coupe or an SUV (sports utility vehicle).

The vehicle 10 has a passenger compartment 14 with a floor 16 and an instrument panel 18. Since the passenger compartment 14, the floor 16 and the instrument panel 18 are conventional vehicle components, further description is omitted for the sake of brevity.

Figure 2:
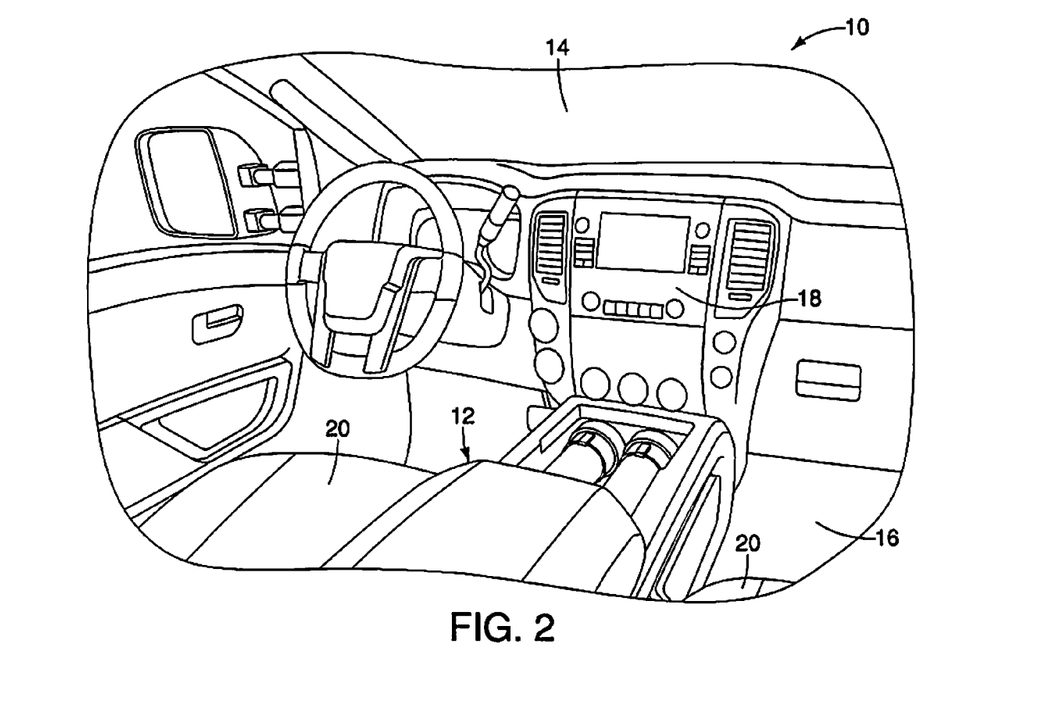
FIG. 2 is a perspective view of the passenger compartment of the vehicle depicted in FIG. 1, showing the center console assembly with removable center console accessories, including a thermos holder assembly in accordance with the first embodiment.

As shown in FIG. 2, the center console assembly 12 is installed to the floor 16 within the passenger compartment 14 of the vehicle 10, between a pair of front seats 20 in a conventional manner. The center console assembly 12 extends from an area between the front seats 20 to an area adjacent to the instrument panel 18.

Figure 3:
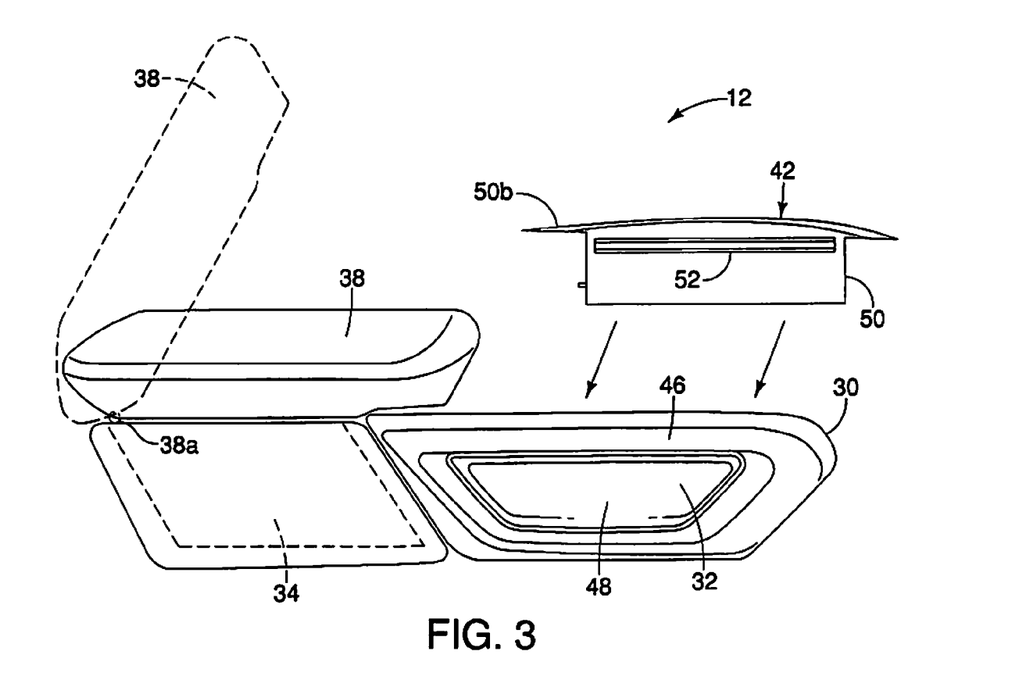
FIG. 3 is a side view of the center console assembly showing the thermos holder assembly being installed to a forward accessory area of the center console assembly in accordance with the first embodiment.
Figure 4:
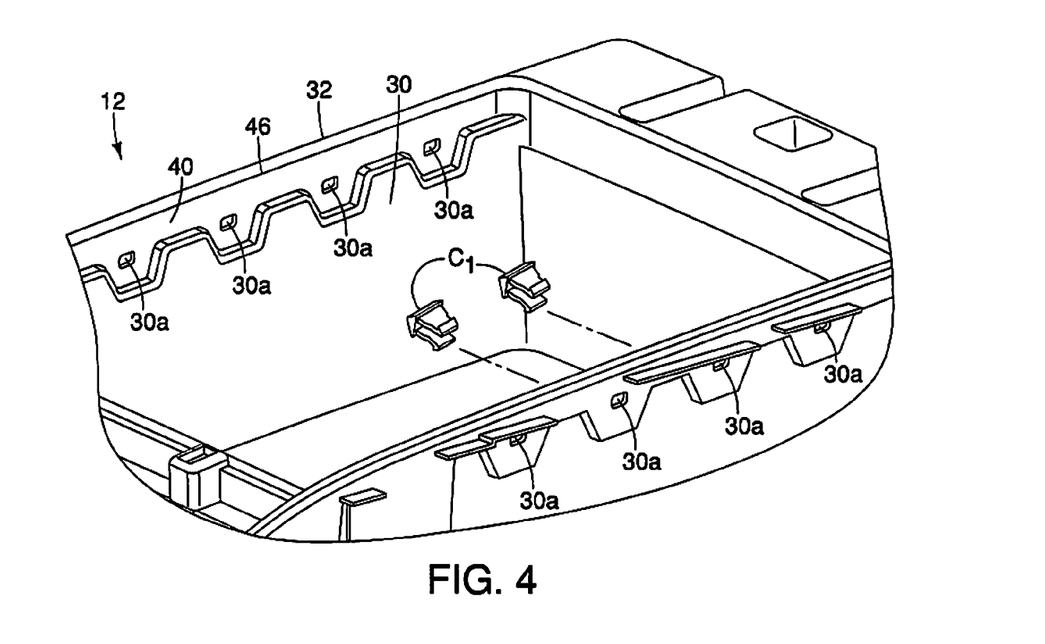
FIG. 4 is a perspective view of a main body of the center console assembly showing a snap-fitting clip structure for retaining the thermos holder assembly located along an upper section of the forward accessory area in accordance with the first embodiment.

As shown in FIGS. 3 and 4, the center console assembly 12 includes a main body 30 having a forward accessory area 32 and a rearward compartment area 34 with a rear compartment lid 38 that is pivotally attached to the rearward compartment area 34 of the main body 30. The main body 30 includes a frame 40 that is partially shown in FIG. 4 that is a structural support structure of the center console assembly 12.

Figure 5:
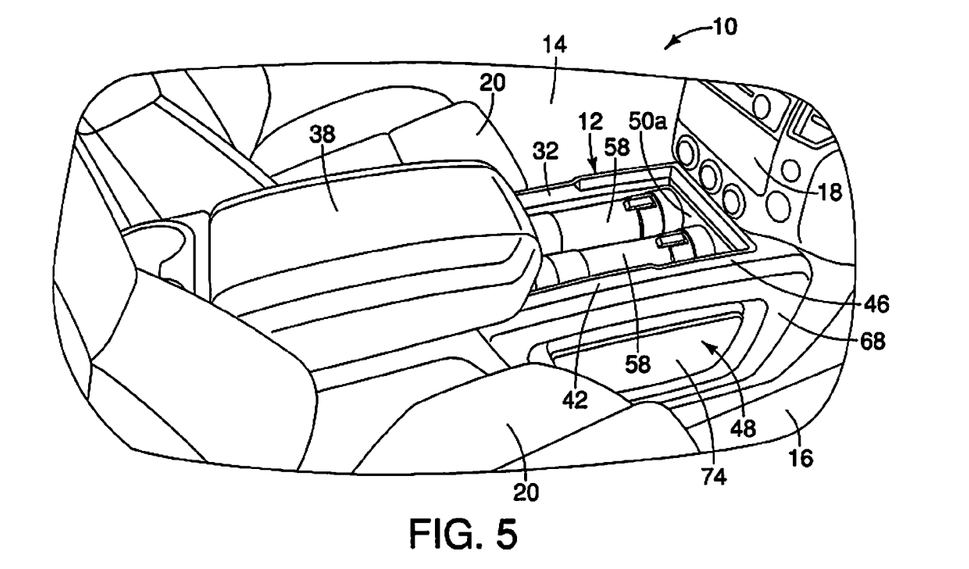
FIG. 5 is a perspective view of the center console assembly showing a lower section and a removable storage bag, and the thermos holder assembly in accordance with the first embodiment.

The rear compartment lid 38 is pivotal about a hinge structure 38a such that the rear compartment lid 38 is movable between a closed orientation (solid lines in FIG. 3) and an open orientation (dashed lines in FIG. 3). The rearward compartment area 34 includes a storage compartment (dashed lines in FIG. 3) that is accessed by moving the rear compartment lid 38 from the closed orientation to the open orientation. As shown in FIGS. 3 and 5, an upper surface of the rear compartment lid 38 is smooth and approximately planar. However, alternatively the rear compartment lid 38 can have a contoured or overall curved upper surface.

The forward accessory area 32 is configured to receive any one of a plurality of interchangeable center console accessories such as a thermos holder assembly 42, in a manner described in greater detail below. The forward accessory area 32 of the main body 30 includes an upper section 46 and a lower section 48. The upper section 46 includes a plurality of clip receiving openings 30a, as shown in FIG. 4. A plurality of clips $C_1$ can be installed into the clip receiving openings 30a. Although only two of the clips $C_1$ (retaining structures) are shown, each of the clip receiving openings 30a is provided with one of the clips $C_1$. Consequently, the overall number of clips $C_1$ is the same as the number of the clip receiving openings 30a. In the depicted embodiment there are eight (8) of the clip receiving openings 30a. Therefore, there are also eight (8) of the clips $C_1$.

As shown in FIG. 3, the thermos holder assembly 40 includes a housing member 50 with a pair of clip receiving brackets 52 (retaining structures) attached to opposite side surfaces thereof (only one clip receiving bracket 52 is shown). The clip receiving brackets 52 are configured to snap-fit into engagement with the plurality of the clips $C_1$. Consequently, the thermos holder assembly 40 can be removed from the center console assembly 12 and replaced with another of the plurality of the removable center console accessories. Additional removable center console accessories are described in greater detail below following a description of the thermos holder assembly 42.

Figure 7:
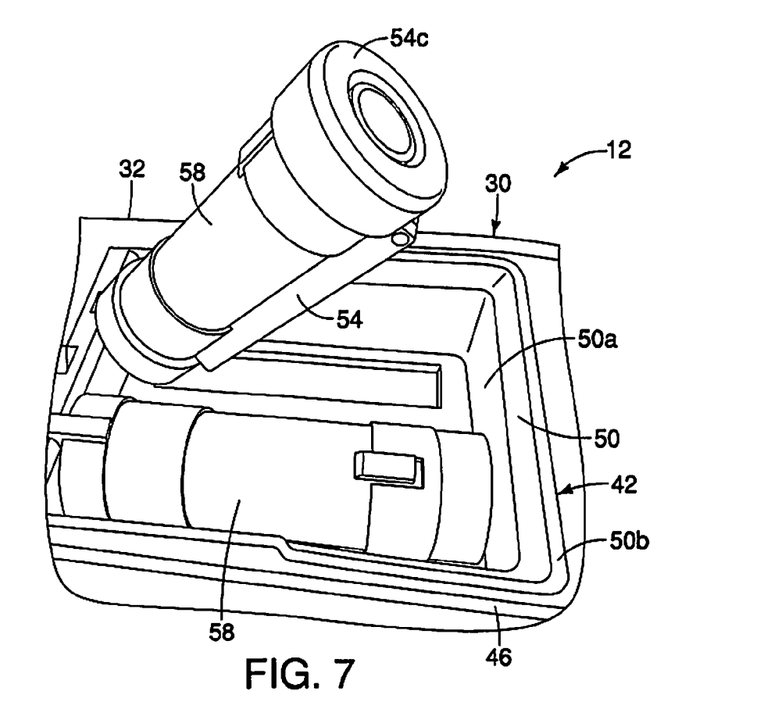
FIG. 7 is a perspective view of the center console assembly showing a first one of the thermos bottles in an inclined orientation relative to the thermos holder assembly in accordance with the first embodiment.
Figure 8:
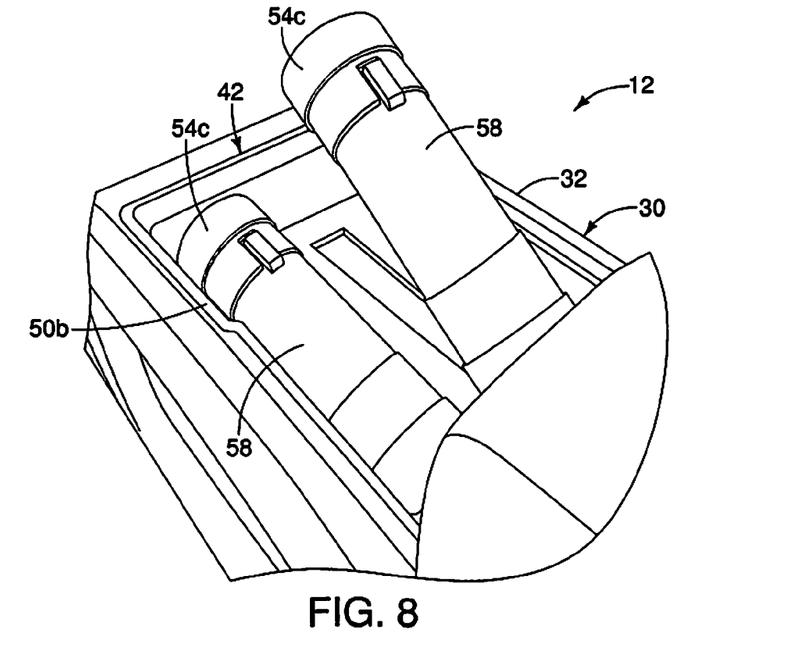
FIG. 8 is another perspective view of the center console assembly showing a second one of the thermos bottles in an inclined orientation relative to the thermos holder assembly in accordance with the first embodiment.
Figure 9:
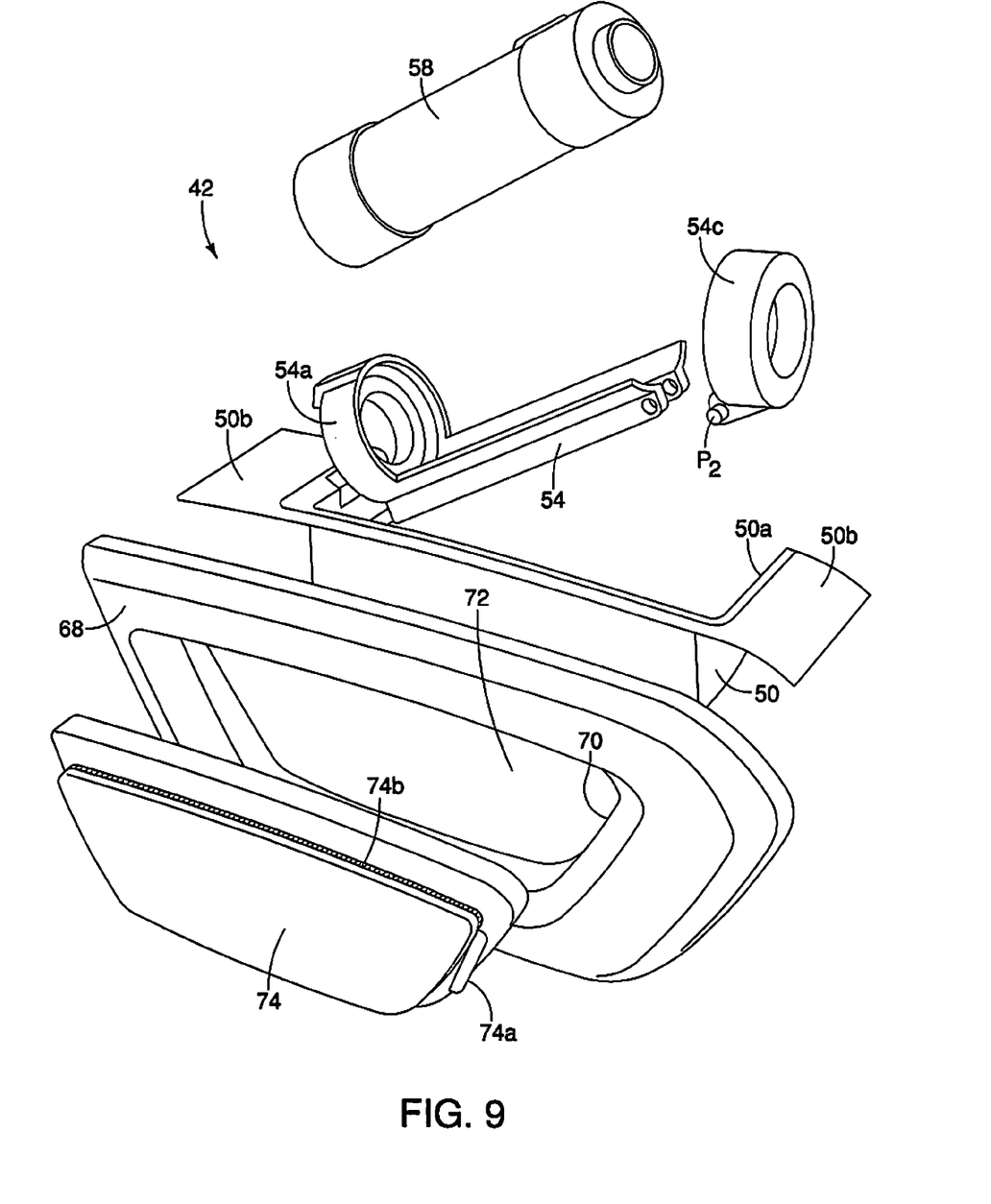
FIG. 9 is an exploded perspective view of elements of the center console assembly and the thermos holder assembly including the removable storage bag, a thermos supporting member and a housing member in accordance with the first embodiment.

A description of the thermos holder assembly 42 is now provided with specific reference to FIGS. 3 and 5-11. As shown in FIGS. 3 and 9, the thermos holder assembly 40 includes the housing member 50, thermos supporting members 54, pivot structures 56 and a pair of thermos bottles 58.

Figure 6:
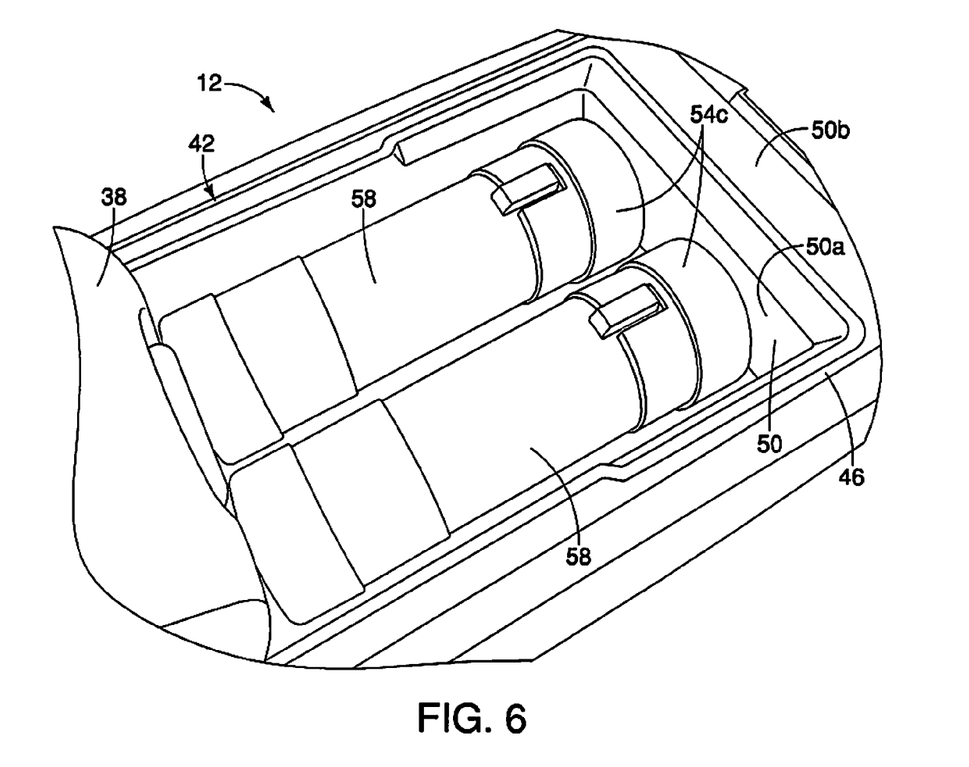
FIG. 6 is another perspective view of the center console assembly showing thermos bottles in a horizontal orientation within the thermos holder assembly in accordance with the first embodiment.

As shown in FIGS. 5-8, there are two thermos supporting members 54, two of the pivot structures 56 and two of the thermos bottles 58. As shown in FIGS. 7 and 8, each of the pivot structures 56 can independently move from a horizontal orientation to an inclined orientation. In horizontal orientation, each thermos supporting member 54, each pivot structure 56 and each thermos bottle 58 is retained within the housing member 50. In the inclined orientation, each one of the thermos supporting members 54, the pivot structures 56 and the corresponding one of the thermos bottles 58 is separately pivoted upward from the housing member 50. In the inclined orientation, the thermos supporting member 54 and the corresponding one of the thermos bottles 58 are pivoted upward at least partially out of the housing such that the thermos bottles 58 are removable from the thermos supporting member 54.

There are two of the thermos supporting members 54, two of the pivot structures 56 and two of the thermos bottles 58. The two thermos supporting members 54 are identical to one another. Similarly, the pivot structures 56 are identical and the thermos bottles 58 are identical. Therefore description of one of each of the thermos supporting members 54, the pivot structures 56 and the thermos bottles 58 applies equally to both. Consequently only one of the thermos supporting members 54, one of the pivot structures 56 and one of the thermos bottles 58 is described below for the sake of brevity.

As shown in FIGS. 5, 6, 10 and 11, the housing member 50 is a pan-like member that defines a concave area 50a that receives the thermos supporting member 54, the pivot structure 56 and the thermos bottle 58. The housing member 50 also includes an outer lip portion 50b that contacts an upper surface of the main body 30 of the center console assembly 12 with the thermos holder assembly 42 installed to the upper section 46 of the forward accessory area 32. Further, as shown in FIGS. 5 and 6, the thermos supporting member 54, the pivot structure 56 and the thermos bottle 58 are completely disposed within the concave area 50a of the housing member 50 when in the horizontal orientation. As shown in FIGS. 7 and 8, the thermos supporting member 54, the pivot structure 56 and the thermos bottle 58 pivot upward extending at least partially above the concave area 50a of the housing member 50 when in the inclined orientation.

Figure 10:
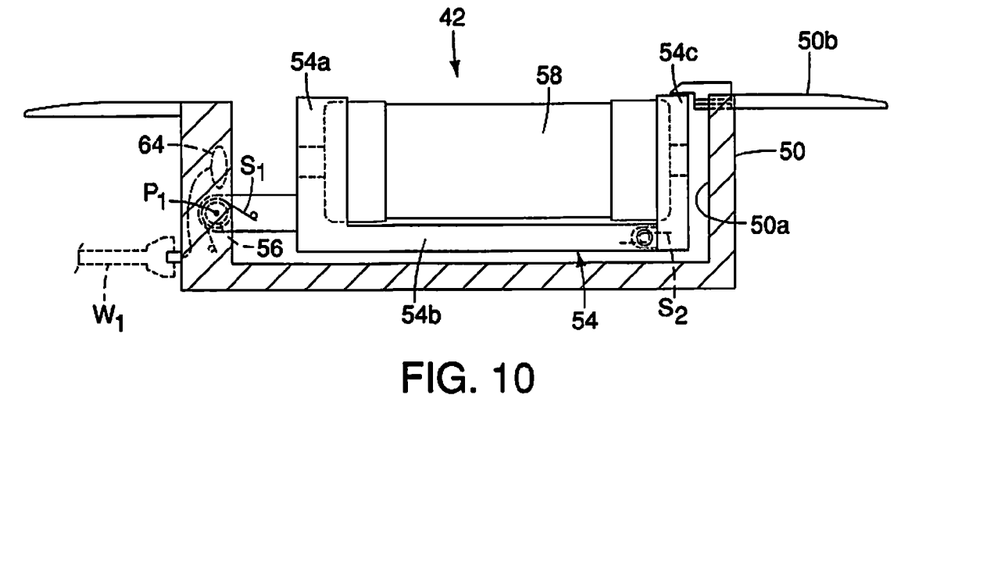
FIG. 10 is a schematic side view of the thermos holder assembly showing the thermos supporting member, a pivoting structure and a pivoting upper retaining ring in a horizontal orientation within the housing member of the thermos holder assembly securing the thermos bottle therein in accordance with the first embodiment.
Figure 11:
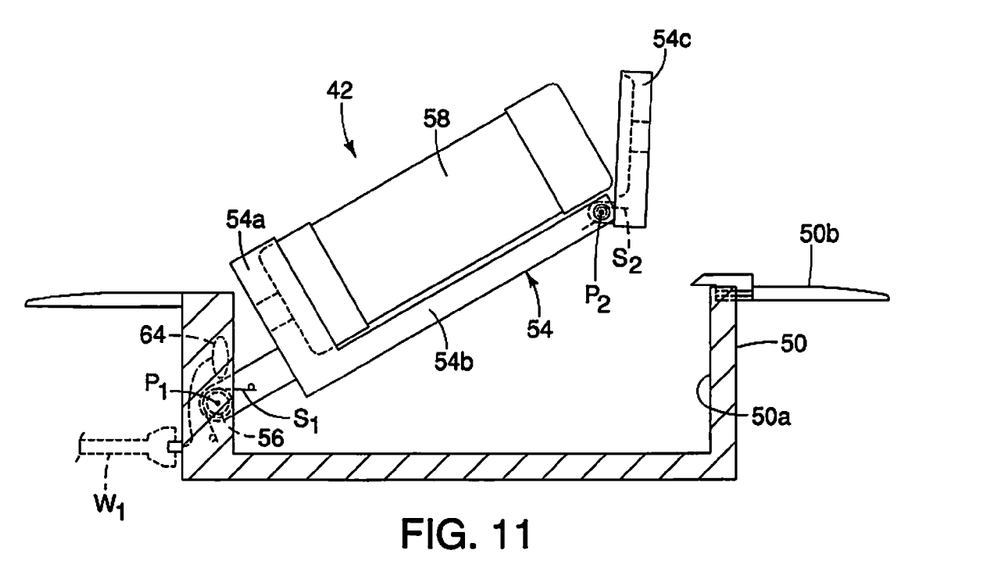
FIG. 11 is another schematic side view of the thermos holder assembly similar to FIG. 10, showing the thermos supporting member, the pivoting structure and the pivoting upper retaining ring in an upward or inclined orientation with the thermos bottle being free for removal from the thermos holder assembly in accordance with the first embodiment.
Figure 12:
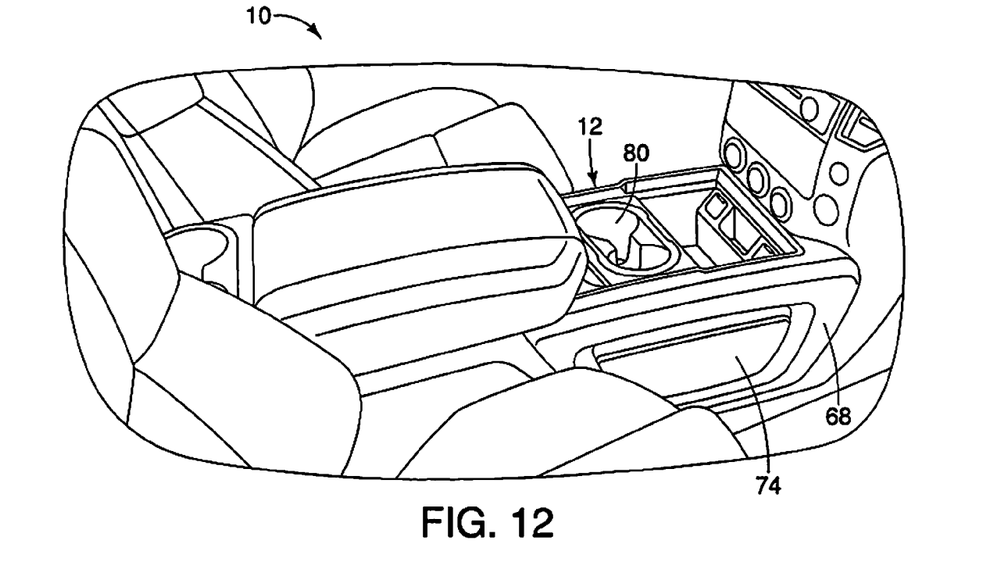
FIG. 12 is a perspective view of the center console assembly similar to FIG. 5, showing the thermos holder assembly removed and replaced another removable center console accessory in the form of a cup holder assembly in accordance with the first embodiment.

As shown schematically in FIGS. 10 and 11, the pivot structure 56 includes a pivot pin $P_1$ that is supported within a portion of the housing member 50 along with a biasing member $S_1$. The biasing member $S_1$ biases the thermos supporting member 54 to move toward the inclined orientation. However, it should be understood that the biasing member $S_1$ can be replaced with an over-center mechanism that biases the thermos supporting member 54 to remain in both the inclined orientation and the horizontal orientation via a single mechanism, in a conventional manner.

The thermos supporting member 54 includes a lower retaining ring 54a, an elongated arm portion 54b and a pivoting upper retaining ring 54c (an end ring). The lower retaining ring 54a and the elongated arm portion 54b are rigidly fixed to one another such that the lower retaining ring 54a and the elongated arm portion 54b pivot together as one element about the pivot pin $P_1$. The upper retaining ring 54a pivots about a second pivot pin $P_2$ that extends through a distal end of the elongated arm portion 54b between a bottle retaining orientation (FIG. 10) and a bottle releasing orientation (FIG. 11). The upper retaining ring 54c is further biased to the retaining orientation by a spring $S_2$. Each of the lower retaining ring 54a and the upper retaining ring 54c includes a respective concaved area $C_1$ and $C_2$. Specifically, the concaved area $C_1$ of the lower retaining ring 54a receives and encircles a bottom end of the thermos bottle 58, and the concaved area $C_2$ of the upper retaining ring 54c receives and encircles an upper end of the thermos bottle 58. With the thermos supporting member 54 in the horizontal orientation, the upper retaining ring 54c is prevented from moving out of the bottle retaining orientation. Therefore, with the thermos supporting member 54 in the horizontal orientation (FIG. 10), the thermos bottle 58 is prevented from being removed. However, once the thermos supporting member 54 is moved upward to the inclined orientation (FIG. 11), the upper retaining ring 54c can be moved in order to remove the thermos bottle 58 from the thermos supporting member 54.

As shown in FIGS. 10 and 11, the thermos holder assembly 42 can include an optional sliding clip structure 62 (a fixing member) that retains the thermos supporting member 54 in the inclined orientation. The sliding clip structure 62 is only shown in FIGS. 10 and 11 as an optional feature.

As is also shown in FIGS. 10 and 11, the housing member 50 of the thermos holder assembly 50 includes a pair of lighting members 64 (only one lighting member 64 is shown) positioned to illuminate the thermos bottles 58 when the thermos supporting members 54 are in the horizontal orientation. The lighting members 64 are connected to a wiring harness $W_1$ that provides electrical power to the lighting members 64.

As shown in FIG. 9, the lower section 48 of the center console assembly 12 includes a side panel 68 that defines an opening 70. The opening 70 provides access to a lower compartment 72. The opening 70 is covered by a removable storage bag 74. The storage bag 74 is shaped to complement the shape of the opening 70 (a side opening). The storage bag 74 and the surfaces that define the opening 72 are provided with respective hook and loop fastener material (not shown) also referred to as Velcro®.

The storage bag 74 can include a zipper 74a that allows access to a storage space (not shown) within the storage bag 74 via a zipper opening 74b.

The thermos holder assembly 42 is one of several removable center console accessories that can be inserted into the upper section 46 of the forward accessory area 32 of the main body 30 of the center console assembly 12. FIGS. 12-16 depict another removable center console accessory. Specifically, FIGS. 12-16 depict a cup holder tray assembly 80. When the thermos holder assembly 42 is removed from the housing member 50, the cup holder tray assembly 80 can be installed.

Figure 13:
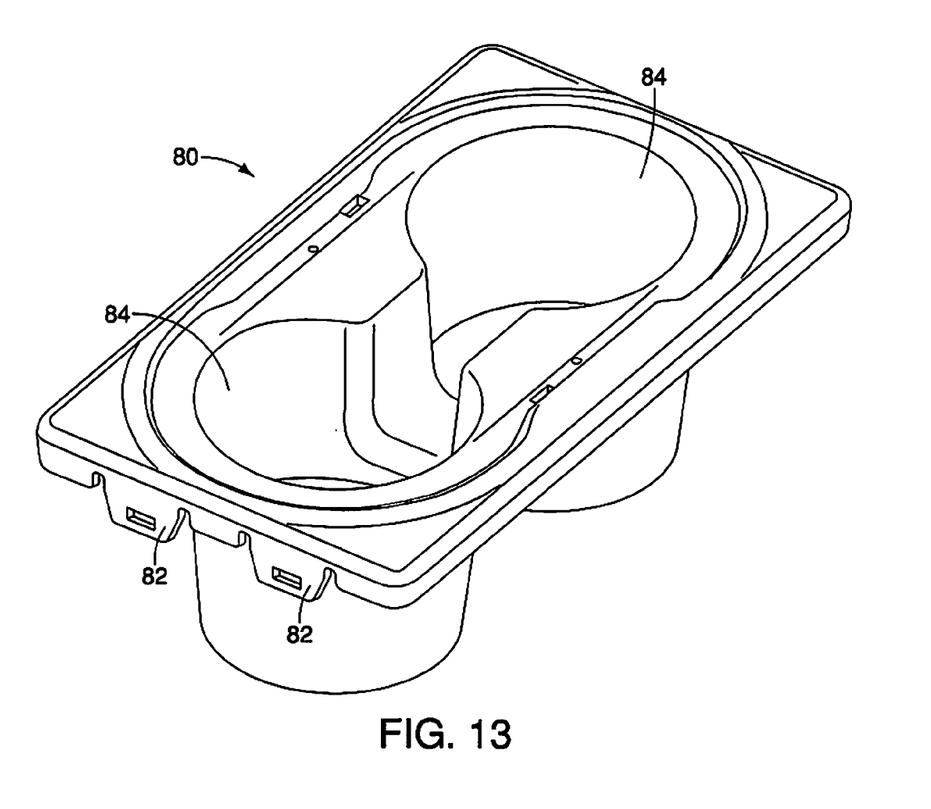
FIG. 13 is a perspective view of the cup holder assembly shown removed from the center console assembly in accordance with the first embodiment.
Figure 14:
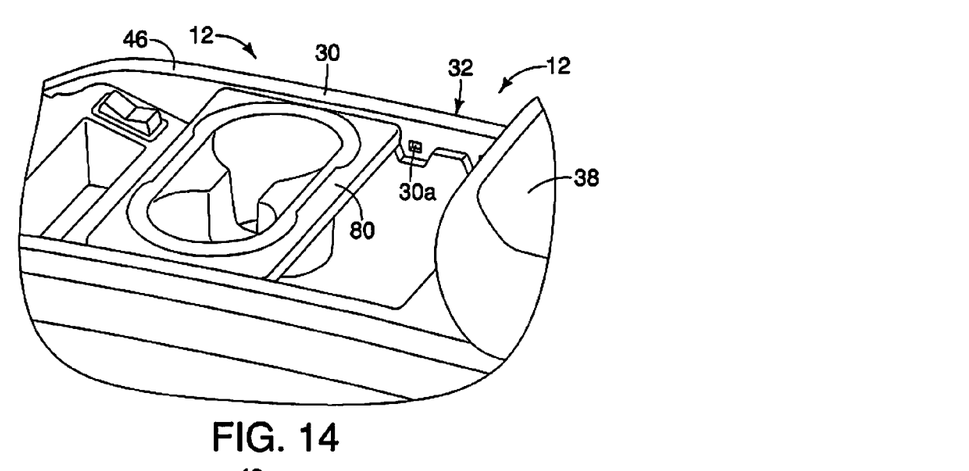
FIG. 14 is a perspective view of the center console assembly showing the cup holder assembly in a first or forward location within the center console assembly in accordance with the first embodiment.

As shown in FIG. 13, the cup holder tray assembly 80 includes clip receiving tabs 82 that are dimensioned and positioned to receive and engage the clips $C_1$ in the main body 30 of the center console assembly 12 in a snap-fit engagement. The cup holder tray assembly 80 is preferably a unitary monolithic member molded in such a way as to define at least two cup receiving cavities 84.

Figure 15:
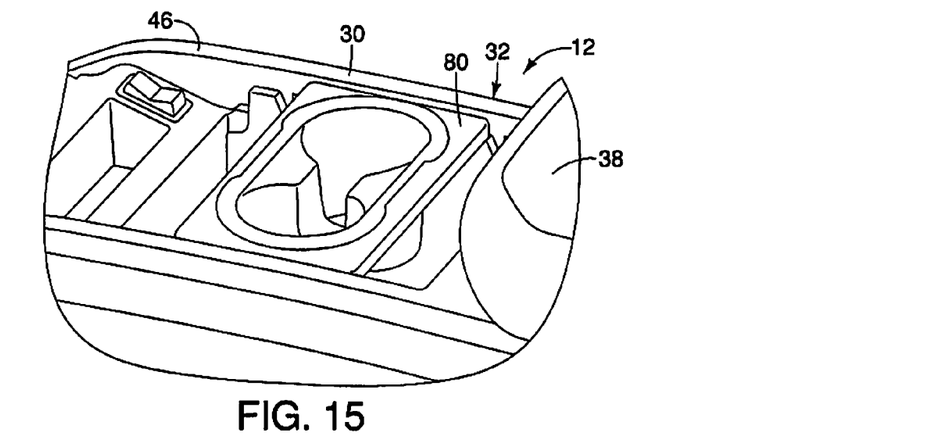
FIG. 15 is a perspective view of the center console assembly similar to FIG. 14 showing the cup holder assembly in a second or middle location within the center console assembly in accordance with the first embodiment.
Figure 16:
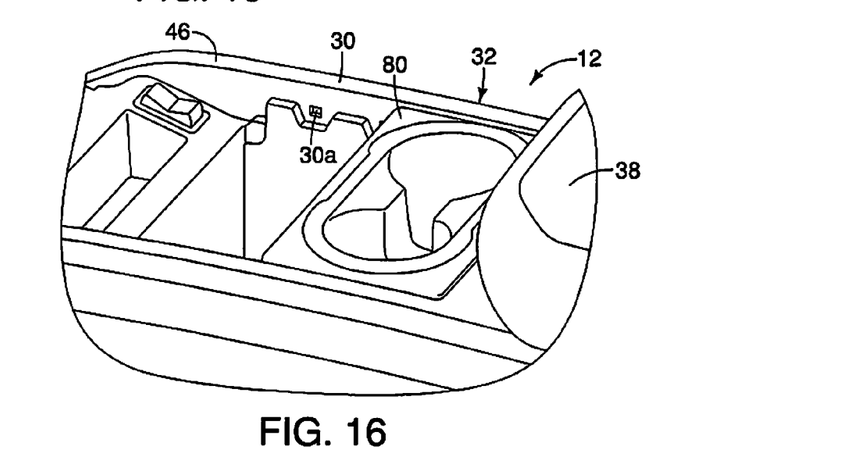
FIG. 16 is a perspective view of the center console assembly similar to FIGS. 14 and 15 showing the cup holder assembly in a third or rearward location within the center console assembly in accordance with the first embodiment.

The cup holder tray assembly 80 has an overall length that is considerably smaller than the overall length of the thermos holder assembly 42. Since there are at least four of the clips $C_1$ along each side of the upper section 46 of the forward accessory area 32 of the center console assembly 12, the cup holder tray assembly 80 can be installed at several positions. For example, in FIG. 14 the cup holder tray assembly 80 is installed at a forward location (a first retaining location). In FIG. 15, the cup holder tray assembly 80 is installed at an intermediate location (a second retaining location). In FIG. 16, the cup holder tray assembly 80 is installed at a rearward location (a third retaining location) relative to the forward accessory area 32 of the center console assembly 12.

Figure 17:
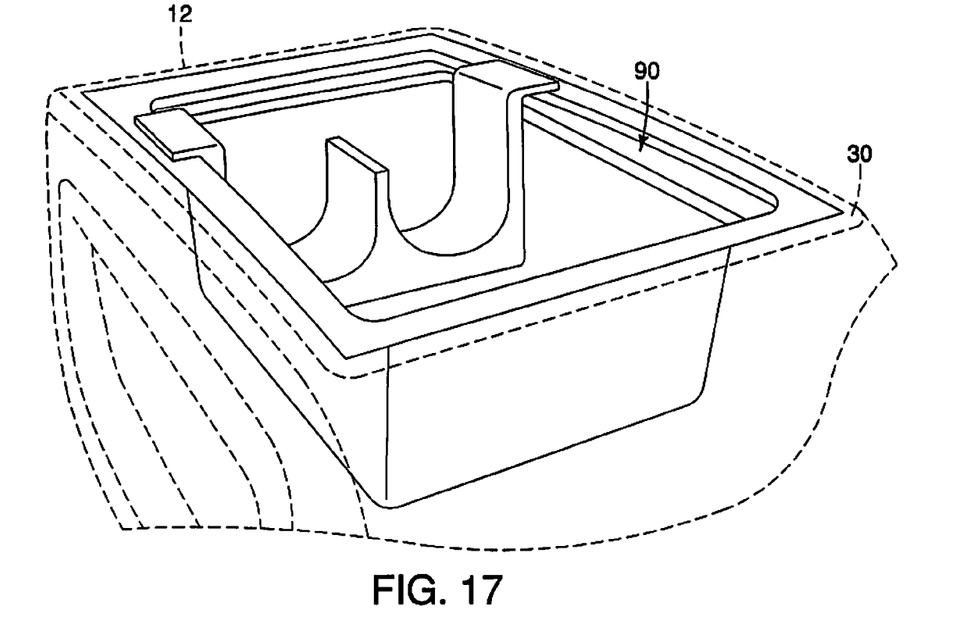
FIG. 17 is a perspective view of the center console assembly (in phantom), showing the thermos holder assembly removed and replaced another removable center console accessory in the form of an open tray storage bin in accordance with the first embodiment.
Figure 18:
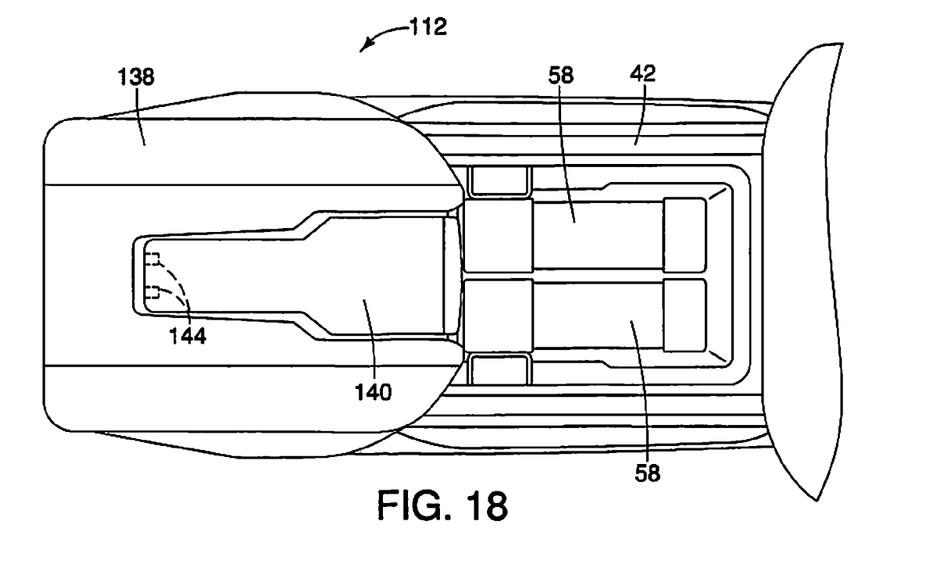
FIG. 18 is a top view of a center console assembly having the thermos holder assembly of the first embodiment along with a rear compartment lid that includes a removable flashlight in accordance with a second embodiment.
Figure 19:
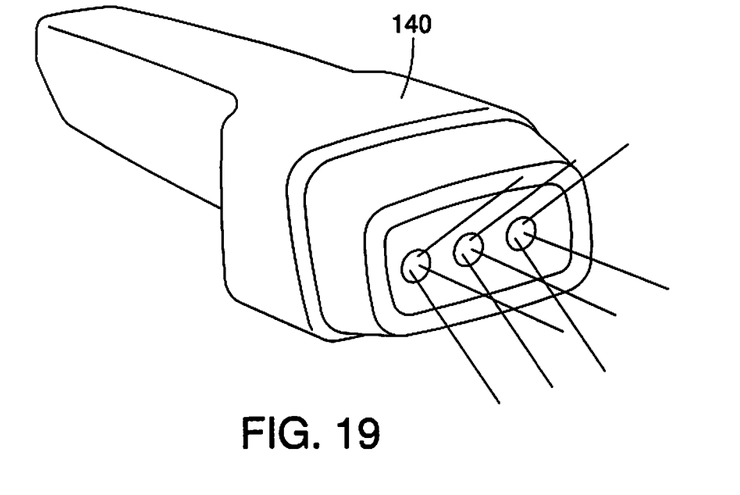
FIG. 19 is a perspective view of the flashlight shown removed from the rear compartment lid of the center console assembly in accordance with the second embodiment.

FIG. 17 depicts another removable center console accessory. Specifically, FIG. 17 depicts an open tray storage bin 90. When the thermos holder assembly 42 is removed from the housing member 50, the open tray storage bin 90 can be installed. Although not shown, the open tray storage bin 90 is provided with clip receiving brackets identical to the clip receiving bracket 52 of the thermos holder assembly 42 in order to snap-fit to the clips $C_1$.

Second Embodiment

Referring now to FIGS. 18-21, a center console assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 20:
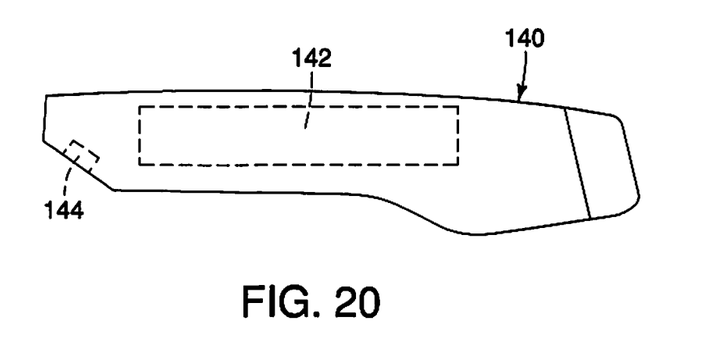
FIG. 20 is a side view of the flashlight shown removed from the rear compartment lid of the center console assembly showing (in phantom) a rechargeable battery and electrodes for recharging the battery when installed to the rear compartment lid in accordance with the second embodiment.

The center console assembly 112 of the second embodiment includes the thermos holder assembly 42 and the thermos bottles 58 as described above with respect to the first embodiment. However, in the second embodiment, the rear compartment lid 38 of the first embodiment has been replaced with a rear compartment lid 138 that includes a recessed area 138a (a flashlight retaining recess) dimensioned to receive and retain a removable flashlight 140. As shown in FIG. 20, the removable flashlight 140 includes a re-chargeable battery 142 and electrodes 144 that are electronically connected to the re-chargeable battery 142. The rear compartment lid 138 includes a matching set of electrodes (not shown) within the recessed area 138a that are provided with electric power such that with the removable flashlight 140 positioned within the recessed area 138a, the re-chargable battery 142 can be charged.

The removable flashlight 140 can be removed from the recessed area 138a and held by a vehicle passenger in order to illuminate a dark area.

Third Embodiment

Figure 21:
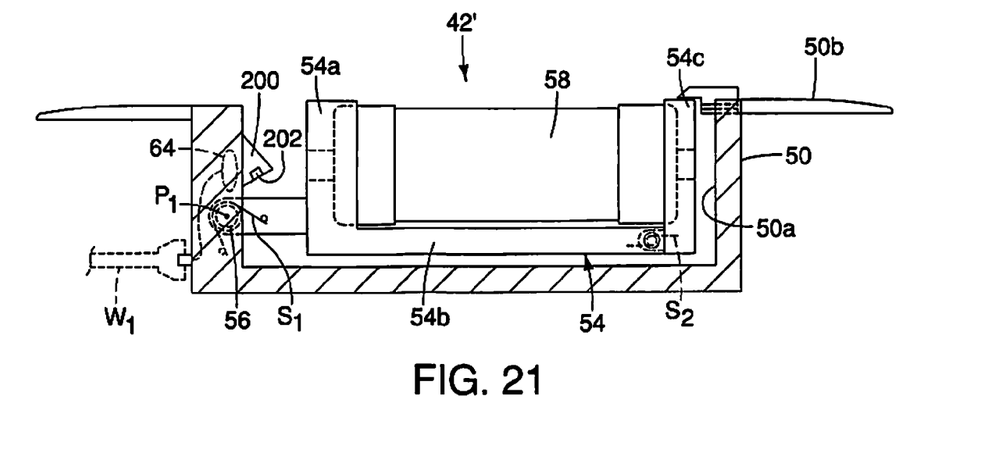
FIG. 21 is a schematic side view of a thermos holder assembly showing a thermos supporting member, a pivoting structure and a pivoting upper retaining ring in a horizontal orientation within the housing member of the thermos holder assembly securing the thermos bottle therein in accordance with a third embodiment.
Figure 22:
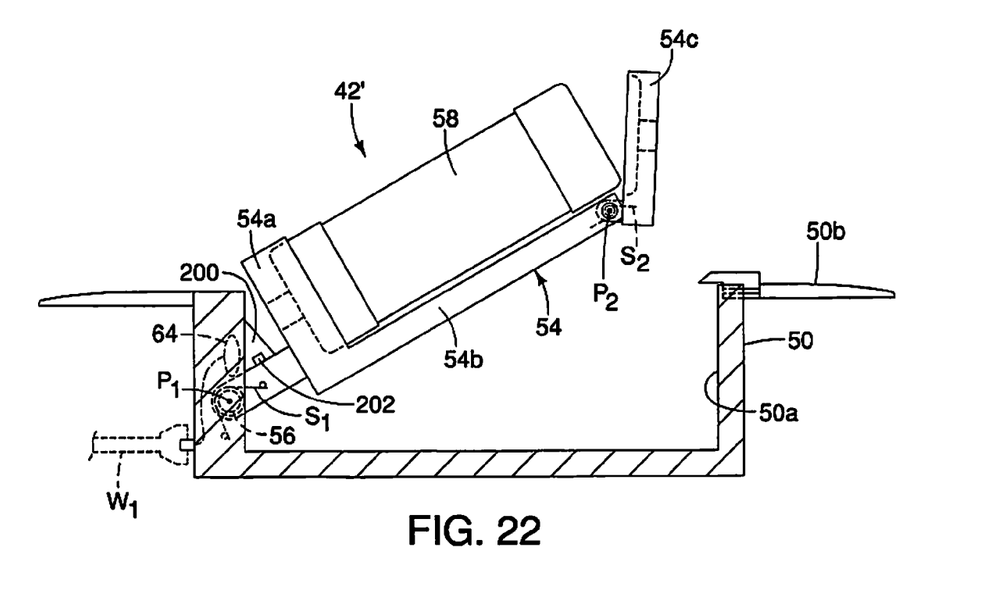
FIG. 22 is another schematic side view of the thermos holder assembly similar to FIG. 21, showing the thermos supporting member, the pivoting structure and the pivoting upper retaining ring being held in an upward or inclined orientation by a magnet in accordance with the third embodiment.

Referring now to FIGS. 21 and 22, a thermos holder assembly 42' in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a single prime (').

In the third embodiment, the thermos holder assembly 42' includes all of the features described above with respect to the thermos holder assembly 42 of the first embodiment. However, in the third embodiment, the thermos holder assembly 42' is modified to include a protrusion 200 that includes a magnet 202. The magnet 202 is positioned to retain the thermos supporting member 54 in the upper or inclined orientation.

The various vehicle elements and features other than the center console assembly 12 are conventional components that are well known in the art. Since these various vehicle elements and features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the center console assembly. Accordingly, these terms, as utilized to describe the present invention should be interpreted relative to a vehicle equipped with the center console assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle center console assembly, comprising:
    a main body having a forward accessory area and a rearward compartment area;
    a rear compartment lid pivotally attached to the rearward compartment area of the main body; and
    at least one removable center console accessory including a thermos holder assembly having a housing installed within the forward accessory area of the main body, a pivot structure supported by the housing and a thermos supporting member that includes a removable thermos bottle, the thermos supporting member being supported by the pivot structure for movement between a horizontal orientation in which the thermos supporting member and the thermos bottle are retained within the housing and an inclined orientation in which the thermos supporting member and the thermos bottle are pivoted upward at least partially out of the housing such that the thermos bottle is removable from the thermos supporting member.

2. The vehicle center console assembly according to claim 1, wherein
    the pivot structure includes a retaining mechanism configured to hold the thermos supporting member in the inclined orientation.

3. The vehicle center console assembly according to claim 2, wherein
    the retaining mechanism includes a biasing member that biases the thermos supporting member to move to the inclined orientation.

4. The vehicle center console assembly according to claim 2, wherein
    the retaining mechanism includes a fixing member that retains the thermos supporting member in the inclined orientation.

5. The vehicle center console assembly according to claim 1, wherein
    the thermos supporting member includes an end ring that pivots relative to a distal end of the thermos supporting member, the end ring being dimensioned to encircle one end of the thermos bottle retaining the thermos bottle to the thermos supporting member.

6. The vehicle center console assembly according to claim 1, wherein
    the housing of the thermos holder assembly includes a lighting member positioned to illuminate the thermos bottle when the thermos supporting member is in the horizontal orientation.

7. The vehicle center console assembly according to claim 1, wherein
the housing includes a second pivot structure that supports a second thermos supporting member having a second thermos bottle.

8. The vehicle center console assembly according to claim 1, wherein
the forward accessory area of the main body includes at least one side opening and a storage space beneath the at least one removable center console accessory.

9. The vehicle center console assembly according to claim 1, wherein
the side opening of the forward accessory area of the main body includes a removable cover that covers the side opening when installed to the main body and exposes the side opening when removed from the main body, the removable cover further defining a storage bag with a zippered opening.

10. The vehicle center console assembly according to claim 1, wherein
the forward compartment area includes a first retaining structure, and
the housing of the thermos holder assembly includes a second retaining structure that is releasably retained by the first retaining structure.

11. The vehicle center console assembly according to claim 10, wherein
the at least one removable center console accessory includes an open tray storage bin installable to the first retaining structure with the thermos holder assembly removed.

12. The vehicle center console assembly according to claim 10, wherein
the at least one removable center console accessory includes cup holder tray assembly installable to the first retaining structure with the thermos holder assembly removed.

13. The vehicle center console assembly according to claim 12, wherein
the cup holder tray assembly includes an open tray storage bin section and a cup holder member positionable at a plurality of position within the cup holder tray assembly.

14. The vehicle center console assembly according to claim 1, wherein
the rear compartment lid has a uniform upper surface.

15. The vehicle center console assembly according to claim 1, wherein
the rear compartment lid has an upper surface that includes a flashlight retaining recess with a removable flashlight stored therein.

16. The vehicle center console assembly according to claim 15, wherein
the flashlight retaining recess of the rear compartment lid is provided with a pair of powered electric contacts, and
the removable flashlight includes a pair of electric contacts and a rechargeable battery such that with the removable flashlight installed within the flashlight retaining recess the rechargeable battery of the removable flashlight can recharge.

* * * * *